United States Patent [19]

Weaver et al.

[11] Patent Number: 4,938,451

[45] Date of Patent: Jul. 3, 1990

[54] METHOD FOR CONTROLLING SOLENOID DE-ENERGIZED AIR GAP

[75] Inventors: Richard D. Weaver, Williamsburg; Sims B. Demere, Newport News; Thomas Hensley, Barhamsville, all of Va.

[73] Assignee: Siemens-Bendix Automotive Electronics L.P., Troy, Mich.

[21] Appl. No.: 396,591

[22] Filed: Aug. 21, 1989

[51] Int. Cl.[5] .............................................. F16K 31/06

[52] U.S. Cl. .......................... 251/129.14; 251/129.15; 251/129.18; 29/890.13

[58] Field of Search ...................... 251/129.14, 129.15, 251/129.18; 29/157.1 R

[56] References Cited

U.S. PATENT DOCUMENTS 4,640,391 2/1987 Maehara et al. .......... 251/129.14 X

FOREIGN PATENT DOCUMENTS 2208183 8/1973 Fed. Rep. of Germany ...................... 251/129.14

*Primary Examiner*—Arnold Rosenthal

*Attorney, Agent, or Firm*—George L. Boller; Russel C. Wells

[57] ABSTRACT

The amount of protrusion of an end of a standard length push pin from a stationary part of a solenoid-actuated valve is measured at a certain point in the valve fabrication process. Then before the armature is assembled into the valve, a depression whose depth is based on the push pin protrusion measurement is coined into the end of the armature that is to bear against the protruding end of the push pin. When the armature is assembled, the protruding end of the push pin seats in the depression that has been formed in the end of the armature with the result that the air gap between this end of the armature and the stationary part from which the push pin protrudes is the desired thickness. The process is well-suited for automated operation so that maximum production efficiencies can be attained.

4 Claims, 1 Drawing Sheet

METHOD FOR CONTROLLING SOLENOID DE-ENERGIZED AIR GAP

BACKGROUND AND SUMMARY OF THE INVENTION

This invention relates generally to solenoid-actuated valves, and more specifically it relates to a method for controlling the thickness of an air gap that exists between the armature and a stationary part of the valve when the solenoid is de-energized.

The thickness of the air gap that exists in the magnetic circuit of a solenoid-actuated valve when the solenoid is de-energized is a major influence on solenoid performance. The thickness of the air gap affects the response time and pull-in force. In a solenoid-actuated valve that uses a push pin between the solenoid armature and the valving element, the thickness of the solenoid de-energized air gap has heretofore been controlled by pre-measuring various components of the assembly and then on the basis of these measurements, selecting a push pin of suitable length to achieve the desired air gap thickness in the final assembly. The proper push rod length is usually achieved either by selection from a group of different length push rods or else by altering the length of an oversized push rod. These procedures limit the efficiency with which such valves can be mass produced.

The present invention relates to a new and improved method for attaining the desired solenoid de-energized air gap in a more efficient manner. The invention contemplates the use of a standard length push pin. The amount of protrusion of an end of the push pin from a stationary part of the assembly is measured at a certain point in the fabrication process. Then before the armature is assembled, a depression whose depth is based on the push pin protrusion measurement is coined into the end of the armature that is to bear against the protruding end of the push pin. When the armature is assembled, the protruding end of the push pin seats in the depression that has been formed in the end of the armature with the result that the air gap between this end of the armature and the stationary part from which the push pin protrudes is the desired thickness. The process is well-suited for automated operation so that maximum production efficiencies can be attained.

The foregoing, as well as additional features, advantages, and benefits of the invention, will be seen in the ensuing description and claims which should be considered in conjunction with the accompanying drawing. The best mode conceived by the inventors for the practice of the invention is disclosed.

BRIEF DESCRIPTION OF THE DRAWING

The single drawing FIGURE is a longitudinal cross sectional view through a solenoid-actuated valve embodying principles of the invention.

DESCRIPTION OF THE PREFERRED EMBODIMENT

Figure 1:
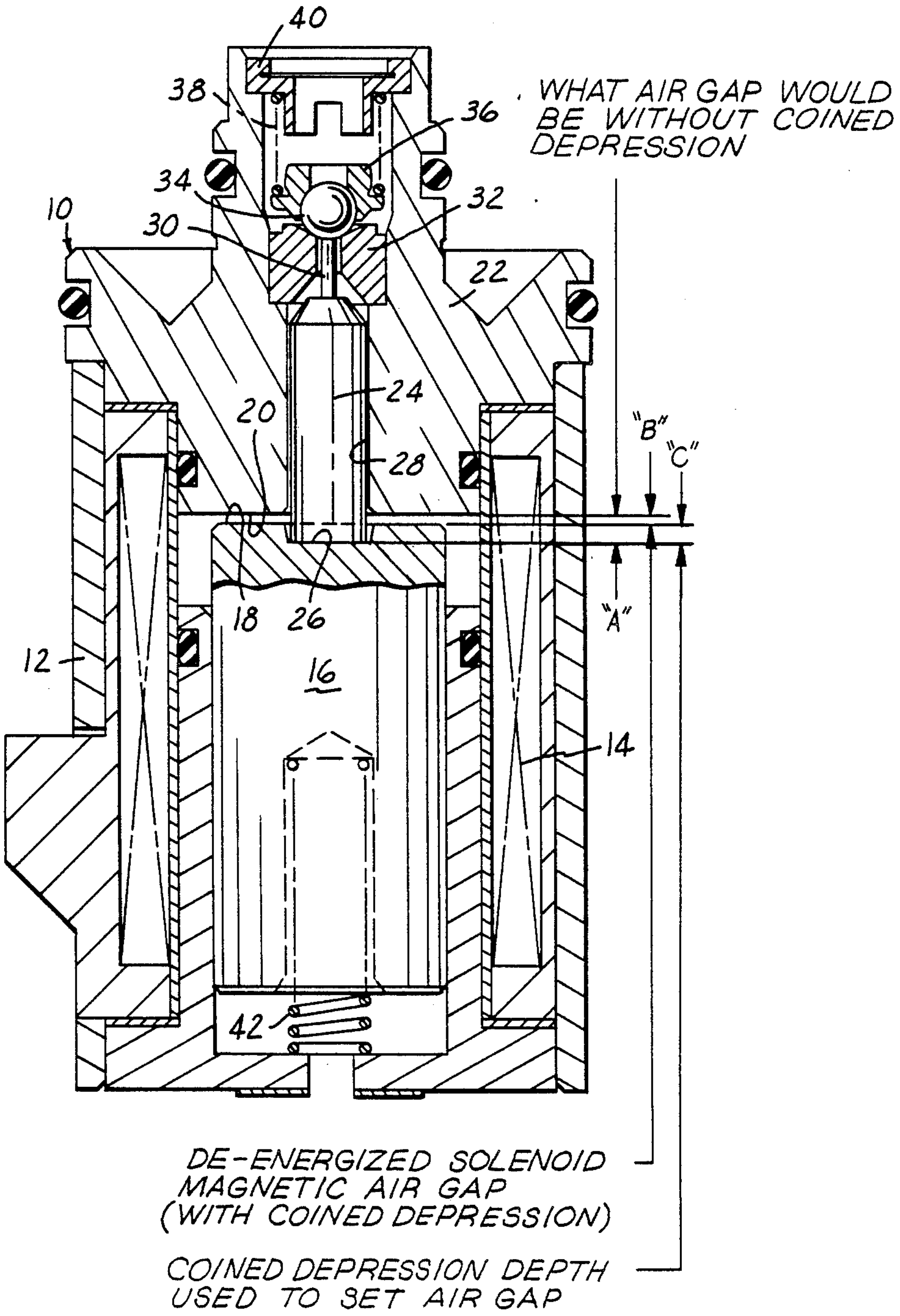

The drawing shows a representative solenoid-actuated valve 10 whose body 12 is composed of a number of individual parts in assembly. Disposed internally of body 12 is a solenoid coil 14 that is itself disposed concentrically around an armature 16. The armature has a cylindrical shape and is guided for axial displacement within body 12 in response to the energization and de-energization of solenoid coil 14.

The condition portrayed by the drawing is for the solenoid coil de-energized. In this condition, the flat upper end face 18 of armature 16 is spaced from the flat lower end face 20 of a stationary part 22 of body 12 by the dimension "B". This dimension is the solenoid de-energized air gap thickness.

The lower end of a cylindrical push pin, or push rod, 24 protrudes from lower end face 20 and seats in a circular depression, 26, centrally formed in the armature's end face 18, part 22 containing a coaxial through-hole 28 for guiding push pin 24 for coaxial motion within the valve body. The upper end of the push pin contains a tip 30 that passes coaxially through a through-hole in a seat member 32.

A valving element in the form of a sphere 34 is seated on seat member 32 to close the through-hole in the seat member. The sphere is captured in a fitting 36 and is forcefully biased against seat member 32 by means of a helical coil spring 38 that acts between fitting 36 and an insert 40 fitted into the open upper end of part 22. A further helical coil spring 42 has its lower end against the lower end wall of body 12 and its upper end inserted into a hole in the lower end of armature 16 to bias the armature and push pin upwardly so that the tip of the push pin contacts sphere 34.

When solenoid coil 14 is energized, armature 16 is forced upwardly to abut face 18 with face 20, thereby closing the air gap. The armature motion is transmitted to push pin 24, causing sphere 34 to be unseated from seat member 32 and opening the through-hole in seat member 32. When the solenoid coil is again de-energized, the valve returns to the condition portrayed by FIG. 1.

The invention relates to the incorporation of depression 26 into end face 18 of armature 16 for the purpose of obtaining the correct dimension "B". During the assembly process, the amount of protrusion of push pin 24 from end face 20 is measured. This is the dimension "A" in the drawing and it amounts to the thickness of the air gap if depression 26 were not formed in armature 16. Since the desired thickness "B" of the air gap is pre-established, the subtraction of dimension "B" from dimension "A" will yield the depth "C" of depression 26 that should be made in the armature in order to have the desired air gap thickness "B" in the finished assembly.

Coining is a procedure that can efficiently and accurately create the required depression 26. A coining punch can be mounted to an adjustable wedge in a coining press. Adjustment of the wedge will adjust the depth of coining so that a desired depth of coining can be obtained by a suitable setting of the wedge. The process lends itself to automation. When push pins of the same length are to be used, the dimension "A" can be used as the input to a closed loop controller that drives a motor coupled to the wedge adjustment drive screw. The controller is programmed with the push pin length, and the drive screw is driven such that the coining punch protrusion will give the desired coining depth "C", i.e. "C"="A"−"B". The armature is loaded into the press and coined to the calculated depth after which it is removed from the press and assembled into the valve. In this way only a single length push pin need be stocked, simplifying both the process and the parts inventory.

Although a preferred example of the invention has been described, it should be understood that principles of the invention can be practiced in other equivalent ways.

What is claimed is:

1. In a solenoid-actuated valve wherein a valving element is actuated by an armature acting through a push pin when the valve solenoid is energized, said valve having a magnetic circuit which, when the solenoid is de-energized, includes an air gap between an axial end face of the armature and a confronting stationary part of the valve, said push pin having one end that is disposed against said axial end face of the armature and another end that is disposed against said valving element, the method of calibrating the valve to yield a desired dimension of said air gap for a given dimension of said push pin, said method comprising measuring the amount of protrusion of said one end of said push pin from said stationary part of the valve, subtracting from this measurement the desired dimension of the air gap, and then imparting to said axial end face of said armature a depression that is equal to the difference between said measurement and the desired dimension of the air gap, and then assembling said armature to the valve such that said one end of said push pin seats in said depression.

2. The method set forth, in claim 1 in which said depression is imparted to said armature by coining.

3. The method set forth in claim 2 in which said axial end of said armature is flat before the coining of said depression into said armature.

4. The method set forth in claim 1 in which the coining of said depression into said armature is conducted in a coining press whose punch is close-loop controlled by said measurement and the desired dimension for said air gap.

* * * * *